June 3, 1958 R. F. LO PRESTI 2,837,204
TENSIONING DEVICE FOR EXTENSIBLE CONVEYORS OR THE LIKE
Filed Oct. 28, 1955 3 Sheets-Sheet 1

INVENTOR.
Roy F. Lo Presti
BY
*Murray A. Gleeson*
ATTORNEY

June 3, 1958  R. F. LO PRESTI  2,837,204
TENSIONING DEVICE FOR EXTENSIBLE CONVEYORS OR THE LIKE
Filed Oct. 28, 1955  3 Sheets-Sheet 3

INVENTOR.
Roy F. LoPresti
BY
Murray A. Gleeson
ATTORNEY

United States Patent Office 2,837,204
Patented June 3, 1958

2,837,204

TENSIONING DEVICE FOR EXTENSIBLE CONVEYORS OR THE LIKE

Roy F. Lo Presti, Chicago, Ill., assignor to Goodman Manufacturing Company, Chicago, Ill., a corporation of Illinois Application October 28, 1955, Serial No. 543,306

12 Claims. (Cl. 198—208)

This invention relates generally to devices for maintaining proper tension on the extensible portions of a belt conveyor, and more particularly to devices for maintaining proper tension on both the conveyor belt and the support strands of a rope frame conveyor.

In some belt conveyors of the prior art proper tension has been maintained on the endless belt by means of a belt tensioning loop including a movable idler carriage which had a tensioning load imposed thereon through the medium of a weight which moved up and down in a pit or the like. Such arrangements are satisfactory for fixed conveying equipment, but in cases where the conveying equipment is extensible to follow the advance of mining equipment, or in cases where the entire extensible conveyor is trammed from one working site to another, such belt tensioning arrangements are not entirely satisfactory.

It is an object of this invention to employ a gravity take-up device for an extensible conveyor, such gravity take-up device aiding in the tractive effort of a head section of an extensible conveyor, and also aiding in the tractive effort in the tail section of an extensible conveyor of the type having an endless belt supported upon laterally spaced flexible strands.

Other objects and important features of the invention will be apparent from a study of the specification following taken with the drawings which together describe and illustrate a preferred embodiment of the invention and what is now considered to be the best mode of practicing the principles thereof. Other embodiments may be suggested to those having the benefit of the teachings herein, and such other embodiments are intended to be reserved especially as they fall within the scope and purview of the appended claims.

Figure 1:
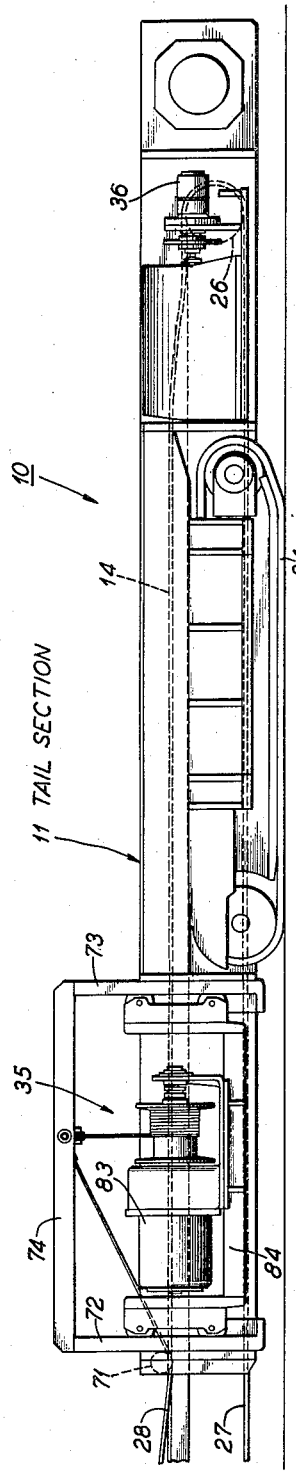
Fig. 1 is a side elevation view of the inby or tail section of an extensible belt conveyor having the improvements according to the present invention embodied therein.
Figure 2:
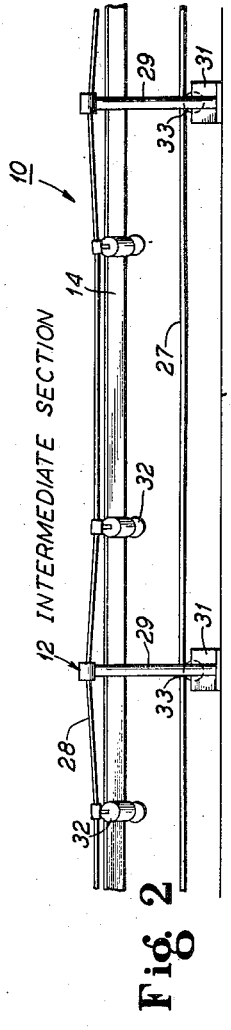
Fig. 2 is a side elevation of an intermediate section of such extensible belt conveyor.
Figure 3:
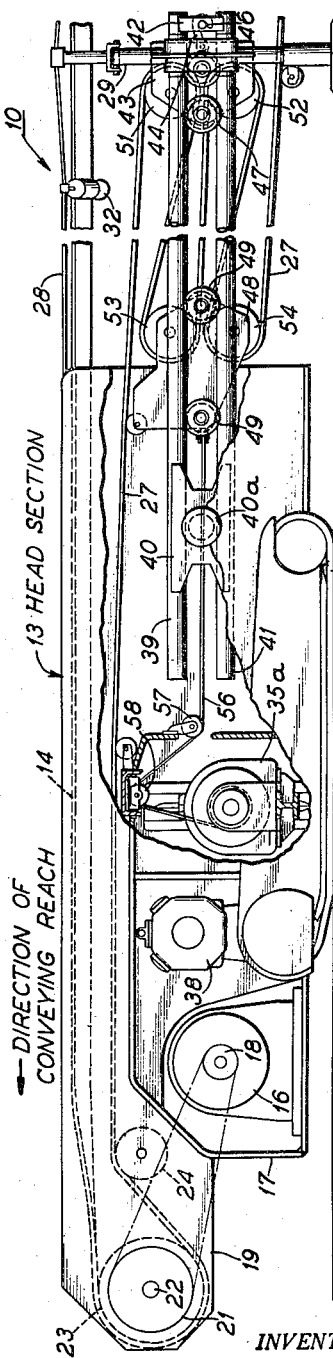
Fig. 3 is a side elevation view of the outby or head section of the conveyor seen in Figs. 1 and 2.

Referring now to Figs. 1 to 3 of the drawings, there is shown an extensible conveyor referred to generally by the reference numeral 10 and consisting of an inby or tail section referred to generally by the reference numeral 11. Intermediate sections referred to generally by the reference numeral 12 are connected to the inby section 11 and to an outby or head section referred to generally by the reference numeral 13.

The sections 11, 12 and 13 support a conveying reach 14 of an endless belt which is driven by a motor 16 located at the head section 13. The motor 16 is mounted upon frame members 17 and has a driving sprocket 18, a driving chain 19 being trained about the drive sprocket 18 and a sprocket 21 fast to a shaft 22 which also has fast thereto a drive pulley 23. The conveying belt 14 is reversed in its direction around the driving pulley 23 and is additionally guided over an idler pulley 24.

The conveyor belt 14 is also reversed in direction around an idler pulley 26 disposed at the inby or tail section 14, and a return reach 27 thereof extends between the tail section 11 and the head section 13, the return reach 27 and the conveying reach 14 being supported at intervals throughout its length as will now be described.

The conveying reach 14 is supported upon a pair of spaced flexible strands 28, the spaced flexible strands being supported at intervals between the tail section 11 and the head section 13 upon standards 29 having feet 31 resting upon a mine floor or the like. Troughing roller assemblies 32 are suspended from the strands 28 intermediate the standards 29, and span the distance between the spaced flexible strands 28, 28. The return reach 27 is supported upon an idler roller 33 at each support standard as seen in Fig. 2.

As seen in Fig. 3 the outby end of the strands 28 may be anchored in any convenient fashion to the outby section 13, but in lieu thereof they may be anchored at points adjacent such head or outby section.

The inby end of the support strands 28 is anchored to a take up device indicated generally by the reference numeral 35 disposed at the inby section 11.

As seen in Fig. 1, the inby section is mounted for tramming movement upon crawler treads 34, such crawler treads being driven through the medium of fluid motors 36. The outby section 13 may likewise be mounted upon crawler treads 37 driven through the medium of fluid motors 38.

The conveyor seen in Figs. 1 to 3 inclusive is of extensible type, and includes a number of bights or loops which can be lengthened or shortened in accordance with the movement of the tail section and the head section with respect to each other. In the usual case the tail section is arranged to follow the advance of a continuous miner or the like, and in such a case the loops or bights are shortened in accordance with such advance.

Means are accordingly provided for storing additional lengths of belt which can be payed out in accordance with the advance of the tail section 11. To this end the outby section 13 is provided on each side thereof with vertically spaced tubular rails 39 and 41. These extend inby of the head section 13 as seen in Fig. 3 to the standard 29 inby of such head section 13. Additional lengths of tubular rails 39 and 41 may be connected to the other rails 39 and 41 by means of internal sleeve connectors, not shown. As seen in Fig. 3, the rails 39 and 41 are joined by welding to a plate 40 which is pivoted at 40a to side frames of the outby section 13, so that a ready connection can be afforded at the support standard 29 inby of the head section 13.

The inby section of such spaced rails 39 and 41 are provided with a stop 42 for a fixed carriage 43 having a hook 44 which engages a latch 46 at such stop 42. The fixed carriage 43 has a pair of guide rollers 47, 47 which are supported between the upper and lower rails 39 and 41. The fixed carriage 43 supports upper and lower idler rollers 51 and 52. A movable carriage 48 has guide rollers 49, 49 fixed thereto which move along the spaced rails 39 and 41, and the movable carriage 48 likewise supports upper and lower idler rollers 53 and 54.

As seen in Fig. 3, the return reach 27 of the conveyor belt is reeved around the idler pulleys 51, 52, 53 and 54 and the strands or portions of the belt between pairs of such pulleys may be shortened or lengthened in accordance with the distance apart of the tail section 11 and the head section 13.

Means are provided for imposing tension on the return reach 27 at all times, and to this end the movable carriage 48 has connected thereto a flexible strand 56 which is guided beneath an idler sheave 57 and over an idler sheave 58. The strand 56 seen in Fig. 3 is maintained at desired tension by a take up device 35a, which is similar in construction to the take up device 35 seen in Fig. 1 of the drawings, the details of which will now be described. Those skilled in the art will readily understand that the same or a substantially identical structure will function for imposing tension upon the strand 56 and at the same time impose tension upon the return reach 27 of the conveyor belt, or for imposing tension upon the spaced flexible support strands 28.

Figure 4:
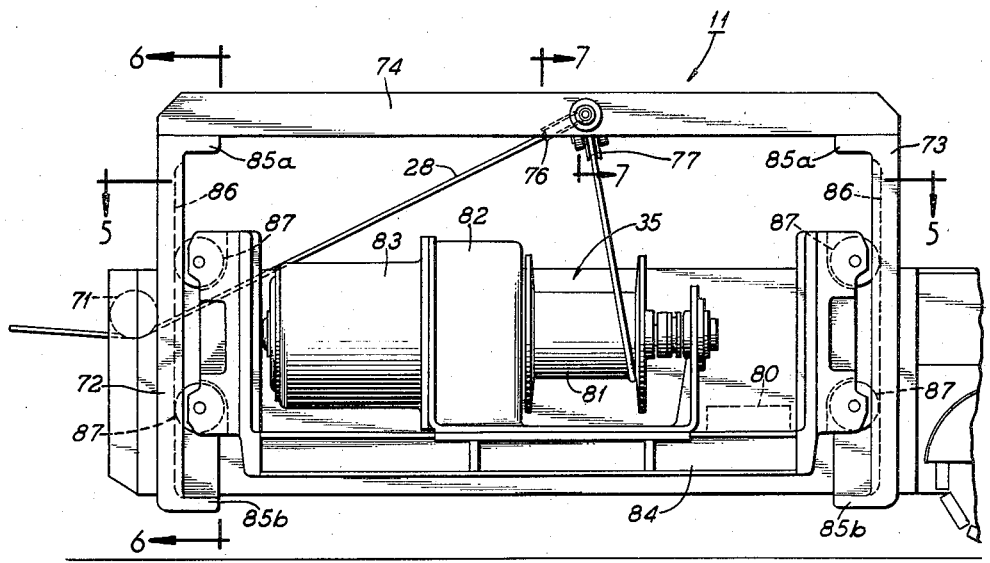
Fig. 4 is a side elevation view to an enlarged scale as compared with Fig. 1, showing an arrangement according to the present invention for imposing tension upon the spaced flexible support strands for the conveying reach of the belt conveyor seen in Figs. 1 to 3 inclusive.
Figure 5:
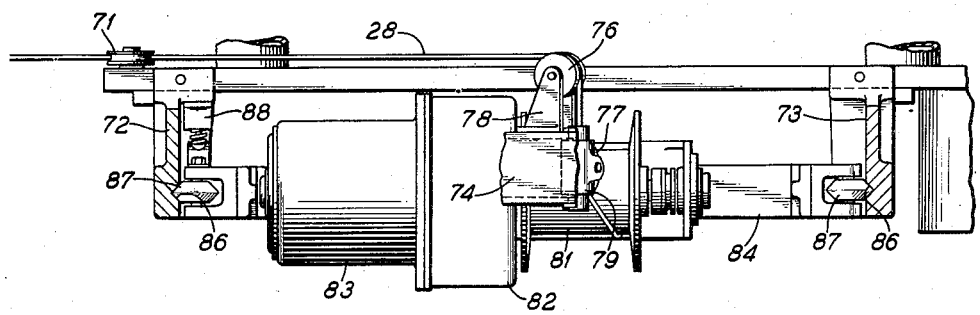
Fig. 5 is a plan view thereof, certain parts being shown in section.

Referring now to Figs. 4 to 8 of the drawings, the flexible strand 28 is guided beneath an idler sheave 71 supported upon one of a pair of vertical guide members 72 and 73, see also Fig. 1. These guide members are spanned by a horizontal frame member 74 and the flexible strand 28, see Fig. 4, is guided around a pair of idler sheaves 76 and 77, sheaves 76 being fixedly supported upon an arm 78, and sheave 77 being freely swivelable in a journal 79 in the frame member 74.

The flexible strand 28 is wound upon a winch drum 81 driven through a speed reducer 82 by a motor 83, the winch assembly described being mounted for up and down movement with a carriage 84. The vertical members 72 and 73 have V-grooves 86 therein and these are engaged by guide wheels 87 mounted at each end of the carriage 84 so that the carriage may move up and down in the grooves 86. The movement of the carriage in the grooves is limited in up and down directions by an upper stop 85a and a lower stop 85b on the vertical members 72 and 73. The carriage 84 is preferably weighted as desired to impose a desired degree of tension upon the strand 28, as by a removable weight 80 seen in Fig. 4.

Means are provided to control the winding of the cable 28 upon the winch drum 81, so that at all times the carriage 84 acts as a counter weight. Means are also provided to cause the winch drum 81 to wind the cable 28 thereon when the tail section 11 moves toward the head section 13 with the carriage 84 suspended as a counter weight, and also to pay out the strand 28 when the tail section 11 moves away from the head section 13, the carriage 84 at such times also acting as a counter weight.

Figure 6:
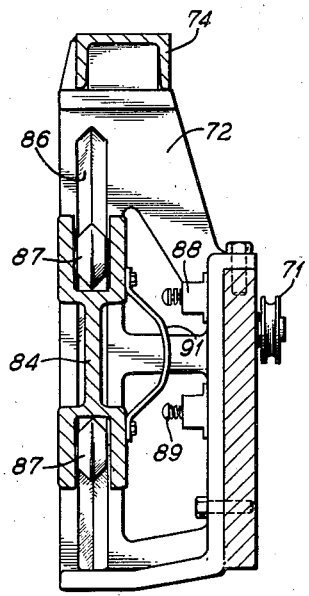
Fig. 6 is a vertical sectional view taken substantially along the line 6—6 of Fig. 4 and looking in the direction of the arrows, showing guiding means for the take up device seen in Fig. 4, and showing also limit switches operable by movement of such take up device and controlling the movement thereof.
Figure 7:
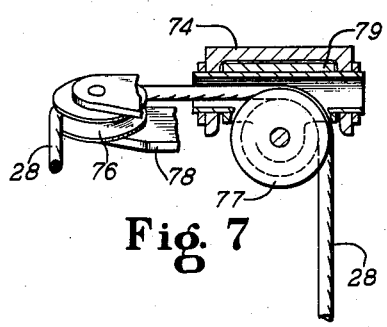
Fig. 7 is a detailed view to an enlarged scale, of a guide for the flexible strand wound upon the take up device seen in Fig. 4, said view being taken along the line 7—7 of Fig. 4 and looking in the direction of the arrows.

To this end the movement of the carriage is caused to actuate one of a pair of limit switches 88 and 89, see also Fig. 6, limit switches 88 and 89 being closed selectively in accordance with the movement of the carriage 84 by an actuator 91. As will be described, when the movement of the carriage 84 is in an upward direction by reason of the tail section 11 following the advance of a continuous miner, limit switch 88 will be closed to cause the motor 83 to pay out cable to maintain the carriage in a suspended condition. Likewise, when the carriage 84 is lowered upon its rails 72 and 73 by reason of the tail section moving toward the head section 13, the limit switch 89 will be actuated to cause the strand 28 to be wound upon the drum 81 to maintain the carriage 84 in a suspended condition.

Figure 8:
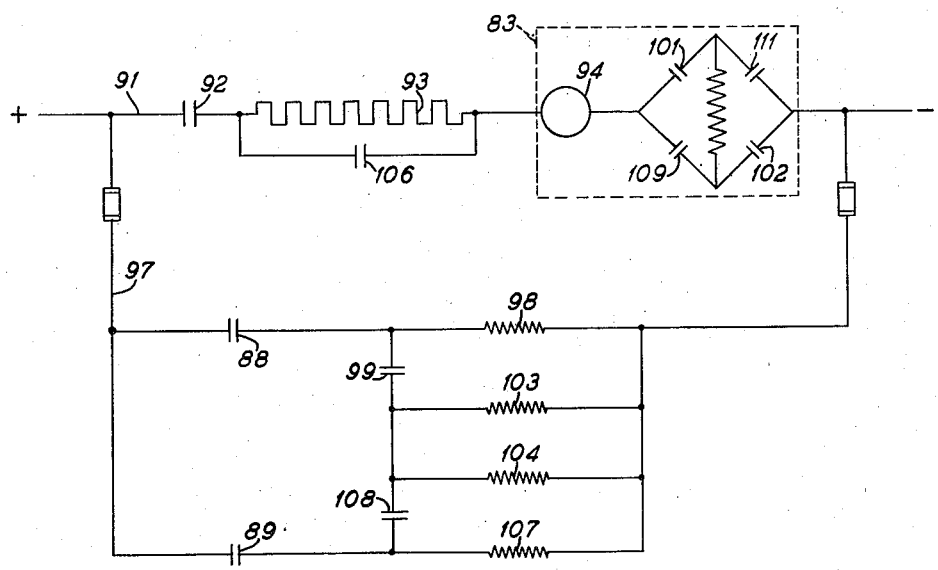
Fig. 8 is a circuit diagram for controlling the operation of the motor and winch seen in the take up device of Fig. 4.

Referring now to Fig. 8 of the drawings, motor 83 is connected in a line 91 having a main starting contactor 92, a starting resistance 93, motor armature 94 with a reversible series winding 96 therefor all connected in series.

Upper limit switch 88 and lower limit switch 89 are connected in parallel with the line 91 by a lead 97 branching therefrom. The closing of limit switch 88 energizes a relay 98 connected in series therewith and having contacts 99, 101 and 102 closed when relay 98 is energized. The closing of contact 99 energizes a main contactor relay winding 103 to close the main contactor 92.

A circuit will accordingly be made through motor 83 with its series winding 96 of a desired polarity, starting voltage being reduced by the resistor 93.

If contact 99 is closed for a sufficient period of time, a time delay relay winding 104 will be energized to close a time delay contactor 106 connected in shunt with starting resistor 93 to enable motor 83 to develop full operating speed at full line voltage.

The foregoing operation of the winch motor 83 takes place to maintain the carriage 84 in a pendant condition to maintain the tension on the strand 28 at the selected value although the tail section 11 may be moving away from head section 13, when also the take up loop seen in Fig. 3 is shortened.

Consider the situation obtaining when the head and tail sections move closer to each other. Under such condition, the winch 81 and its carriage will descend to close the lower limit switch 89 which will then close to raise the carriage 84 by winding up the strand 28 or 56 as the case may be.

When limit switch 89 is closed it will energize a relay winding 107 to close contacts 108, 109 and 111. The closing of contact 108 will as before energize main contactor relay 103 to close main contactor 92. The closing of contacts 109 and 111 will reverse the field of field winding 96 to reverse the motor 83. If limit switch 89 is closed for a sufficient period, time delay relay 104 will also be energized to close time delay contactor 106 and shunt out starting resistor 93 to provide full voltage across motor 83.

It is believed evident that the operation of the motor 83 will at all times cause the weighted carriage to impose a desired tension upon the strands 28 and 56. The weight of the carriage and its motor operated winch thereby provides additional tractive effort on the head and tail sections to prevent slipping thereof on their crawler treads by reason of the tension in the strands.

Another feature of the mechanism described, resides in the fact the winches can be driven slowly by reason of the starting resistance to correct for minor changes in strand tension. When the tail section 11, for example, is being trammed toward or away from the head section 13, full line voltage is available for full speed operation of the winch motors.

While the invention has been described in terms of a preferred embodiment, its scope is intended to be limited only by the claims here appended.

I claim as my invention:

1. In an endless conveyor, a head section and a tail section, flexible strand means extending between said sections, and means for imposing tension on said strand means comprising a weighted carriage supported on one of said sections and movable in a vertical direction with respect thereto, means for guiding said carriage in its movement, a winch including a drive motor therefor, said winch being mounted on said carriage and having said strand means wound on said winch, and means for driving said winch in a direction to pay off said strand means when said carriage has reached an upper limit of travel and for driving said winch in a direction to wind said strand means thereon when said carriage has reached a lower limit of travel, a limit switch disposed near a limit of travel of said carriage in either direction, a circuit controlled by said limit switches for driving said motor in a direction to maintain said carriage between said upper and lower limits of travel, and means for controlling the speed of said motor.

2. In an endless conveyor, a head section and a tail section, flexible strand means extending between said sections, and means for imposing tension on said strand means comprising a weighted carriage supported on one of said sections and movable in a vertical direction with respect thereto, means for guiding said carriage in its movement with respect to said section, a winch including a drive motor therefor, said winch being mounted on said carriage and having said strand means wound upon said winch, means for driving said winch in a direction to pay off said strand means when said carriage has reached an upper limit of travel and for driving said winch in a direction to wind said strand means thereon when said carriage has reached a lower limit of travel, a limit switch disposed near a limit of travel of said carriage in either direction, and a circuit controlled by said limit switch for driving said motor in a direction to maintain said carriage between the upper and lower limits of travel.

3. In an endless conveyor, a head section and a tail section, flexible strand means extending between said sections, and means for imposing tension on said strand means comprising a weighted carriage supported on one of said sections and movable in a vertical direction with respect thereto, means for guiding said carriage in its movement with respect to said section, a winch including a drive motor therefor, said winch being mounted on said carriage and having said strand means wound upon said winch, means for driving said winch in a direction to pay off said strand means when said carriage has reached one limit of travel and for driving said winch in a direction to wind said strand means thereon when said carriage has reached the other limit of travel, and limit switches actuated by movement of said carriage to its limit of travel for energizing said motor to return the carriage to a position between desired limits of movement.

4. In an endless conveyor, a head section and a tail section, flexible strand means anchored at one of said sections, and means for imposing tension on said strand means comprising a weighted carriage supported on one of said sections and movable in a vertical direction with respect thereto, means for guiding said carriage in its movement with respect to said section, a winch including a drive motor therefor, said winch being mounted on said carriage and having said strand means wound upon said winch, means for driving said winch in a direction to pay off said strand means when said carriage has reached one limit of travel and for driving said winch in a direction to wind said strand means thereon when said carriage has reached the other limit of travel, and a circuit including limit switches connected therein for controlling the operation of said carriage in corresponding direction.

5. In an endless conveyor, a head section and a tail section, flexible strand means anchored at one of said sections, and means for imposing tension on said strand means comprising a weighted carriage supported on one of said sections and movable in a vertical direction with respect thereto, means for guiding said carriage in its movement with respect to said section, a winch including a drive motor therefor, said winch being mounted on said carriage and having said strand means wound upon said winch, means for driving said winch in a direction to pay off said strand means when said carriage has reached one limit of travel and for driving said winch in a direction to wind said strand means thereon when said carriage has reached the other limit of travel, and limit switches for controlling the operation of said motor and the movement of said carriage in corresponding directions.

6. In an endless conveyor, a head section and a tail section, flexible strand means anchored at one of said sections, and means for imposing tension on said strand means comprising a weighted carriage supported on one of said sections and movable in a vertical direction, means for guiding said carriage in its movement, a winch including a drive motor therefor, said winch being mounted on said carriage and having said strand means wound upon said winch, and means for driving said winch in a direction to pay off said strand means when said carriage has reached one limit of travel and for driving said winch in a direction to wind said strand means thereon when said carriage has reached the other limit of travel.

7. In an extensible conveyor, a head section and a tail section, means for tramming at least one of said sections over a mine floor or the like, an endless belt trained at each section so as to have a conveying reach and a return reach, flexible strand means for supporting said conveying reach, said endless belt having at least one bight therein for providing movement of one of said sections with respect to the other while changing the length of said bight correspondingly, and means for placing a desired tension on said strand means and said endless belt comprising a pair of carriages, each being mounted respectively on one of said sections and movable in a vertical direction with respect to such section, a winch including a drive motor therefor mounted on each of said carriages, each of said winches having said strand means wound thereon, means for driving each of said winches in a direction to pay off its strand therefrom when said carriage has reached one limit of travel, and for driving said winch in a direction to wind its strand thereon when said carriage has reached the other limit of travel, a limit switch disposed near a limit of travel of said carriage in either direction, a circuit controlled by said limit switches for driving said motor in a direction to maintain said carriage between said desired limits of travel, and means for controlling the speed of said motor.

8. In an extensible conveyor, a head section and a tail section, means for tramming at least one of said sections over a mine floor or the like, an endless belt trained at each section so as to have a conveying reach and a return reach, flexible strand means for supporting said conveyor reach, said endless belt having at least one bight therein for providing movement of one of said sections with respect to the other while changing the length of said bight correspondingly, and means for placing a desired tension on said strand means and said endless belt comprising a pair of carriages, each being mounted respectively on one of said sections and movable in a vertical direction with respect to such section, a winch including a drive motor therefor mounted on each of said carriages, each of said winches having said strand means wound thereon, means for driving each of said winches in a direction to pay off its strand therefrom when said carriage has reached one limit of travel, and for driving said winch in a direction to wind its strand thereon when said carriage has reached the other limit of travel, a limit switch disposed near a limit of travel of said carriage in either direction, and a circuit controlled by said limit switches for driving said motor in a direction to maintain said carriage between desired limits of travel.

9. In an extensible conveyor, a head section and a tail section, means for tramming at least one of said sections over a mine floor or the like, an endless belt trained at each section so as to have a conveying reach and a return reach, flexible strand means for supporting said conveyor reach, said endless belt having at least one bight therein for providing movement of one of said sections with respect to the other while changing the length of said bight correspondingly, and means for placing a desired tension on said strand means and said endless belt comprising a pair of carriages, each being wound respectively on one of said sections and movable in a vertical direction with respect to such section, a winch including a drive motor therefor mounted on each of said carriages, each of said winches having said strand means wound thereon, means for driving each of said winches in a direction to pay off its strand therefrom when said carriage has reached one limit of travel, and for driving said winch in a direction to wind its strand thereon when said carriage has reached the other limit of travel, and limit switches actuated by said carriage near its limit of travel in one direction for energizing said motor to return the carriage to a position between desired limits of travel.

10. In an extensible conveyor, a head section and a tail section, means for tramming at least one of said sections over a mine floor or the like, an endless belt trained at each section so as to have a conveying reach and a return reach, flexible strand means for supporting said conveyor reach, said endless belt having at least one bight therein for providing movement of one of said sections with respect to the other while changing the length of said bight correspondingly, and means for placing a desired tension on said strand means and said endless belt comprising a pair of carriages, each being mounted respectively on one of said sections and movable in a vertical direction with respect to such section, a winch including a drive motor therefor mounted on each of said carriages, each of said winches having said strand means wound thereon, means for driving each of said winches in a direction to pay off its strand therefrom when said carriage has reached one limit of travel, and for driving said winch in a direction to wind its strand thereon when said carriage has reached the other limit of travel, and a circuit including limit switches connected therein for controlling the operation of said motor and the movement of said carriage in corresponding directions.

11. In an extensible conveyor, a head section and a tail section, means for tramming at least one of said sections over a mine floor or the like, an endless belt trained at each section so as to have a conveying reach and a return reach, flexible strand means for supporting said conveying reach, said endless belt having at least one bight therein for providing movement of one of said sections with respect to the other while changing the length of said bight correspondingly, and means for placing a desired tension on said strand means and said endless belt comprising a pair of carriages, each being mounted respectively on one of said sections and movable in a vertical direction with respect to such section, a winch including a drive motor therefor mounted on each of said carriages, each of said winches having said strand means wound thereon, means for driving each of said winches in a direction to pay off its strand therefrom when said carriage has reached one limit of travel, and for driving said winch in a direction to wind its strand thereon when said carriage has reached the other limit of travel, and limit switches for controlling the operation of said motor and the movement of said carriage in corresponding directions.

12. In an extensible conveyor, a head section, means for tramming at least one of said sections over a mine floor or the like, an endless belt trained at each section so as to have a conveying reach and a return reach, flexible strand means for supporting said conveyor reach, said endless belt having at least one bight therein for providing movement of one of said sections with respect to the other while changing the length of said bight correspondingly, and means for placing a desired tension on said strand means and said endless belt comprising a pair of carriages, each being mounted respectively on one of said sections and movable in a vertical direction with respect to such section, a winch including a drive motor therefor mounted on each of said carriages, each of said winches having a strand wound thereon, and means for driving each of said winches in a direction to pay off its strand therefrom when said carriage has reached one limit of travel, and for driving said winch in a direction to wind its strand thereon when said carriage has reached the other limit of travel.

No references cited.